(12) United States Patent
Dinh et al.

(10) Patent No.: US 7,388,150 B2
(45) Date of Patent: Jun. 17, 2008

(54) SELF-SUPPORTING ELECTRICAL FIXTURE SUPPORT

(75) Inventors: Cong Thanh Dinh, Collierville, TN (US); John Charles Archer, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/607,222

(22) Filed: Dec. 1, 2006

(65) Prior Publication Data

US 2007/0074889 A1  Apr. 5, 2007

Related U.S. Application Data

(63) Continuation-in-part of application No. 11/311,453, filed on Dec. 19, 2005, now Pat. No. 7,205,476.

(60) Provisional application No. 60/638,224, filed on Dec. 21, 2004, provisional application No. 60/665,906, filed on Mar. 28, 2005, provisional application No. 60/670,202, filed on Apr. 11, 2005.

(51) Int. Cl.
*H01H 9/02* (2006.01)

(52) U.S. Cl. .................. 174/58; 174/50; 174/60; 174/63; 220/4.02; 248/906

(58) Field of Classification Search .......... 174/50, 174/58, 60, 135, 63, 48; 220/3.2, 3.3, 4.02, 220/3.8; 439/535; 248/906, 56, 342, 343, 248/309.1; 52/220.1
See application file for complete search history.

(56) References Cited

U.S. PATENT DOCUMENTS

| | | |
|---|---|---|
| 3,588,019 A * | 6/1971 | Cozeck ................ 248/228.6 |
| 3,701,448 A | 10/1972 | Vadnals |
| 3,724,795 A | 4/1973 | Callanan |
| 3,848,764 A | 11/1974 | Salg |
| 3,891,113 A | 6/1975 | Salg |
| 3,977,640 A * | 8/1976 | Arnold et al. ............. 248/542 |
| 4,874,905 A | 10/1989 | Schnell et al. |
| 5,234,119 A | 8/1993 | Jorgensen et al. |
| 5,408,045 A | 4/1995 | Jorgensen et al. |
| 5,833,110 A | 11/1998 | Chandler et al. |
| 5,841,068 A * | 11/1998 | Umstead et al. ............ 174/58 |
| 5,854,443 A | 12/1998 | Reiker |
| 5,965,844 A * | 10/1999 | Lippa ...................... 174/481 |
| 6,147,304 A * | 11/2000 | Doherty ................... 174/481 |
| 6,191,362 B1 | 2/2001 | Gretz |
| 6,207,897 B1 | 3/2001 | Reiker |

(Continued)

*Primary Examiner*—Dhiru R Patel
(74) *Attorney, Agent, or Firm*—Hoffman & Baron, LLP

(57) ABSTRACT

An electrical outlet box and/or assembly is attachable to a wall or ceiling stud. The assembly in one embodiment includes an outlet box having a perimetrical side wall, a back wall and open front face defining a box interior. The assembly may also include a communications frame. A mounting bracket is integrally formed with the box and extends from the side wall. The mounting bracket includes, integrally formed therewith, an attachment structure for directly securing the bracket to the stud and positionally fixing the bracket without the use of additional securement hardware. The bracket may be a U-shaped member having a planar face abutting the face of the stud and a pair of spaced apart arms extending therefrom for engagement with opposite sides of the stud. The assembly may also support more than one box/frame. The box and frame may be supported on either side of the bracket.

7 Claims, 13 Drawing Sheets

U.S. PATENT DOCUMENTS

| | | |
|---|---|---|
| 6,355,883 B1 | 3/2002 | Gretz |
| 6,573,446 B1 | 6/2003 | Umstead et al. |
| 6,677,523 B1 | 1/2004 | Gretz |
| 6,827,229 B2 | 12/2004 | Dinh et al. |

* cited by examiner

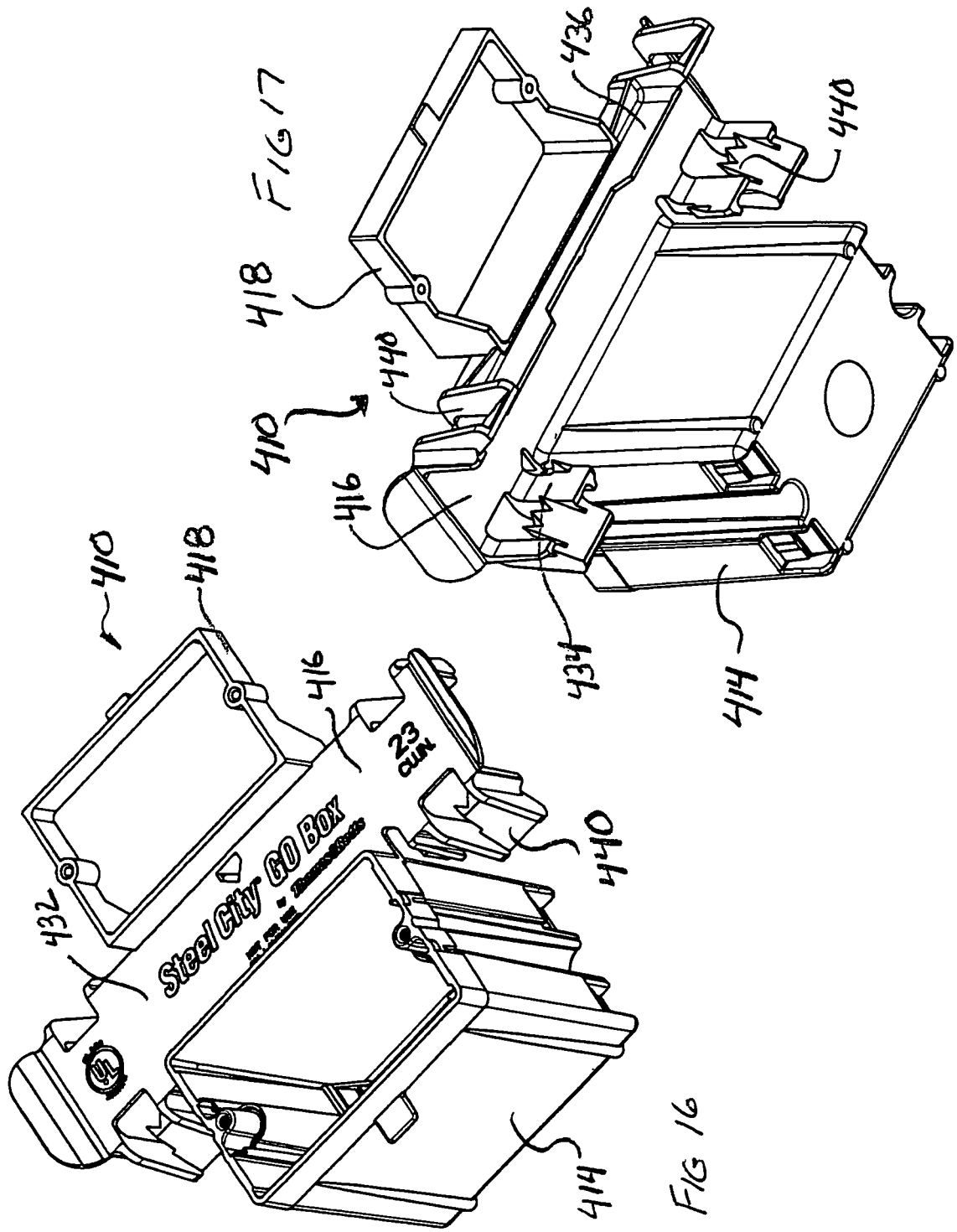

“SELF-SUPPORTING ELECTRICAL FIXTURE SUPPORT”

CROSS REFERENCE TO RELATED APPLICATIONS

This application is a continuation-in part of U.S. patent application Ser. No. 11/311,453, filed on Dec. 19, 2005, and which claims priority to co-pending U.S. Patent Application No. 60/638,224, filed Dec. 21, 2004, titled NON-METALLIC ELECTRICAL BOX WITH SNAP-ON ASSEMBLY, co-pending U.S. patent application No. 60/665,906, filed Mar. 28, 2005, titled SELF-SUPPORTING ELECTRICAL OUTLET BOX, and co-pending U.S. Patent Application No. 60/670,202, filed Apr. 11, 2005, titled SELF-SUPPORTING ELECTRICAL FIXTURE SUPPORT.

FIELD OF THE INVENTION

The present invention relates generally to an electrical fixture support such as an outlet box or frame. More particularly, the present invention relates to a non-metallic outlet box which may be secured directly to the wall stud without use of additional installation hardware.

BACKGROUND OF THE INVENTION

Electrical outlet boxes are commonly used for terminating wires to electrical fixtures such as switches and receptacles. Such boxes may also include single and multiple gang configurations and/or frames for supporting communications fixtures. In common use, the outlet boxes are attached to a wood or metal wall stud. The outlet box must be properly positioned on the stud so that an outer covering of wall board can be affixed thereover.

The art has seen a wide variety of materials used to form electrical outlet boxes. Typically, boxes are either metallic or non-metallic in design. With respect to both types of boxes, fastening hardware is usually used to secure the box to the stud. The fastening hardware may take the form of wood screws or nails for affixing the box to a wood stud or sheet metal screws when affixing the box to a metal stud. In either case, separate hardware and separate steps for securement must be employed.

The art has also seen the use of various brackets which may be attached to an outlet box to secure the outlet box to the stud. However, even when using such brackets, the bracket itself must be fixed to the stud using securement hardware. While certain of the outlet box and bracket designs allow the bracket to be temporarily affixed to the stud for positioning purposes, permanent securement of the bracket to the stud, in order to comply with applicable codes which dictate the load which the box must withstand, require additional securement hardware.

One such applicable code requirement is a requirement mandated by Underwriters Laboratories (UL). UL Code 514C (29.1) requires in part that "a bracket or other device for securing a flush device or other box not intended to support a fixture to a structural wall stud shall withstand a pull of 50 pounds (222N) . . . the bracket may bend; but the results of the test are not applicable if the bracket breaks or if the box is pulled loose from the bracket."

As may be appreciated, it is time consuming and costly for the installer to have to employ separate securement hardware in order to secure the outlet box to the stud in a manner in which the box will perform adequately in its intended environment and meet applicable code requirements.

It is, therefore, desirable to provide an outlet box which may be directly attachable to a structural stud and which by virtue of such attachment permanently secures the box to the stud in a manner which meets requisite code requirements.

SUMMARY OF THE INVENTION

The present invention provides an assembly for supporting electrical fixtures to a structural stud. The assembly includes a first fixture support for terminating a first electrical fixture and a second fixture support for terminating a second electrical fixture. A mounting bracket is integrally formed with and extends between both the first and second fixture supports. The mounting bracket includes thereon an attachment structure for directly securing and positionally fixing the bracket to the structural stud without use of additional securement hardware.

In a preferred embodiment, a first fixture support is an electrical outlet box for supporting a power fixture. The second fixture support is a communications frame for supporting a communications fixture. The bracket and the fixture supports may be integrally molded.

BRIEF DESCRIPTION OF THE DRAWINGS

FIGS. 16 and 17 shown in top and bottom views, respectively, a still further embodiment of an electrical outlet box of the present invention used to support fixtures on either side of a stud.

DETAILED DESCRIPTION OF THE PREFERRED EMBODIMENTS

Figure 1:
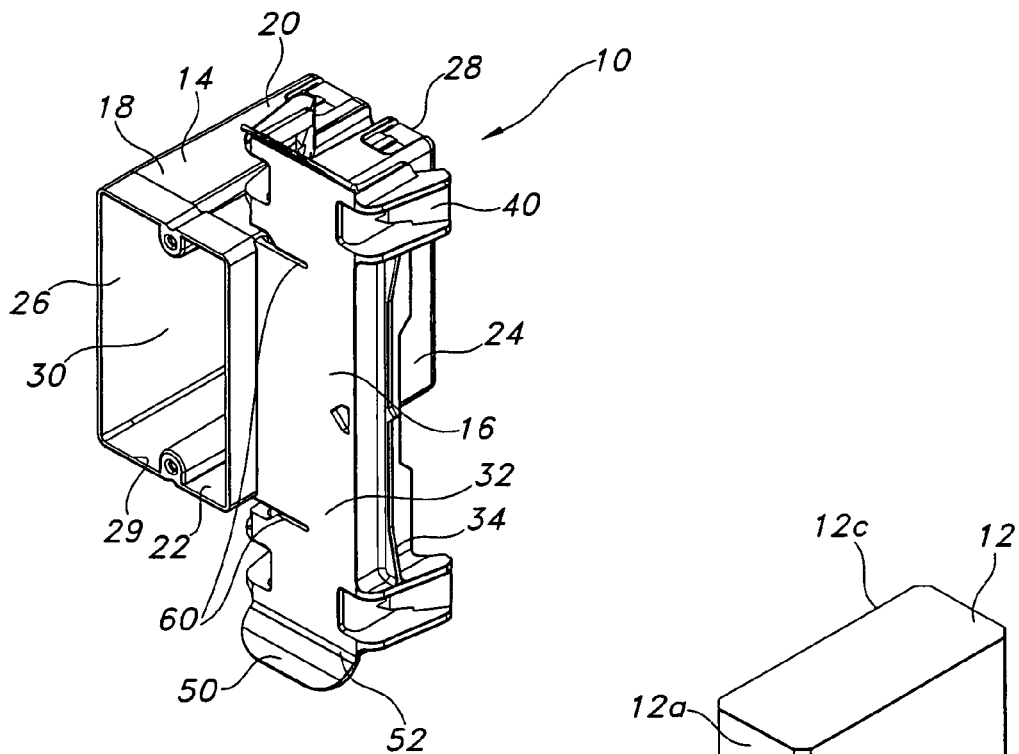
FIG. 1 is a perspective showing of the outlet box assembly of the present invention.

The present invention provides an outlet box assembly including an outlet box and/or a communications fixture frame and an integrally formed bracket. In a preferred embodiment, the present invention is directed to a non-metallic outlet box formed of a suitably molded plastic. As will be discussed in further detail hereinbelow, boxes of this type are typically mounted adjacent a wood stud. These wood studs are structural studs such as wall or ceiling studs. These non-metallic boxes are secured to the face of the stud by use of wood screws or nails. Such securement of the box directly to the wood stud assures that if a load is placed on the box, it will not detach from the wood stud. For wall boxes mounted on vertical studs, such a load can be a vertically directed load along the direction of the length of the stud or it can be a horizontal load perpendicular thereto. In either case, the securement of the box directly to the stud by use of fastening hardware assures that the box will not detach from its secured position against the stud. The present invention provides an electrical box assembly which secures a non-metallic electrical box to a structural wood stud such as a wall or ceiling stud directly without need for additional fastening hardware and which still maintains the box in secure engagement with the stud upon application of either a horizontal or vertical load.

With reference to FIGS. 1-6 of the present application, an electrical outlet box assembly 10 is shown. Outlet box assembly 10 is preferably a non-metallic integrally formed member, typically molded of suitable plastic. The outlet box assembly 10 is designed to be self secured or "snapped" on to a wall stud 12 shown in FIG. 2. As is well known, stud 12 is an elongate wooden member such as a "2×4" having a front face 12a and opposed sides 12b and 12c.

Outlet box assembly 10 includes two distinct portions, an electrical outlet box 14 and a securement bracket 16. Outlet box 14 is similar to conventional non-metallic outlet boxes well known in the art, including a perimetrical wall 18, defined by top and bottom walls 20 and 22 and opposed lateral walls 24 and 26. Outlet box 14 has a solid back wall 28, an open front face 29, and defines a box interior 30, for accommodating electrical termination devices such as switches and receptacles (not shown) which terminate electrical cables (also not shown) as is well known in the art. While a solid box is shown in the present example, as set forth further hereinbelow, the preset invention contemplates use of a fixture frame for supporting data/communication fixtures.

Bracket 16 is generally a U-shaped member having a planar face 32 and a pair of spaced apart arms 34 and 36 extending perpendicularly therefrom. As may be appreciated from the depiction in FIG. 2, planar face 32 is designed for flush support against the face 12a of stud 12, while the arms 34 and 36 are designed to extend along sides 12b and 12c respectively of stud 12. Also, the planar face 32 is recessed from the front face 29 of box 14 for accommodating wall board adjacent face 32.

Figure 3:
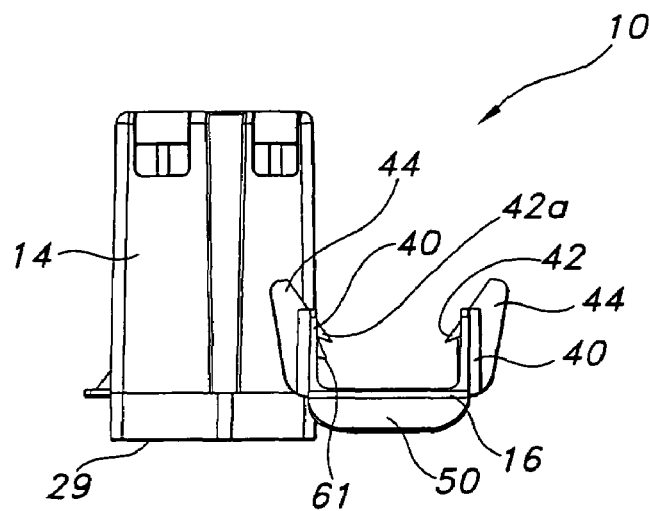
FIG. 3 is a top plan view of the outlet box assembly of FIG. 1.
Figure 4:
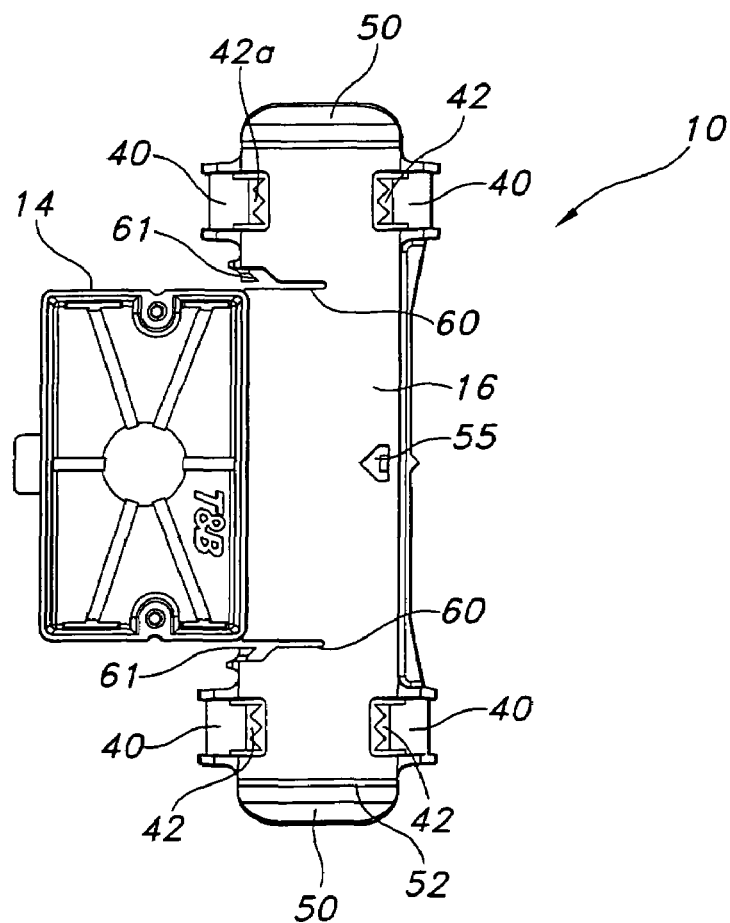
FIG. 4 is front plan view of the outlet box assembly of FIG. 1.
Figure 5:
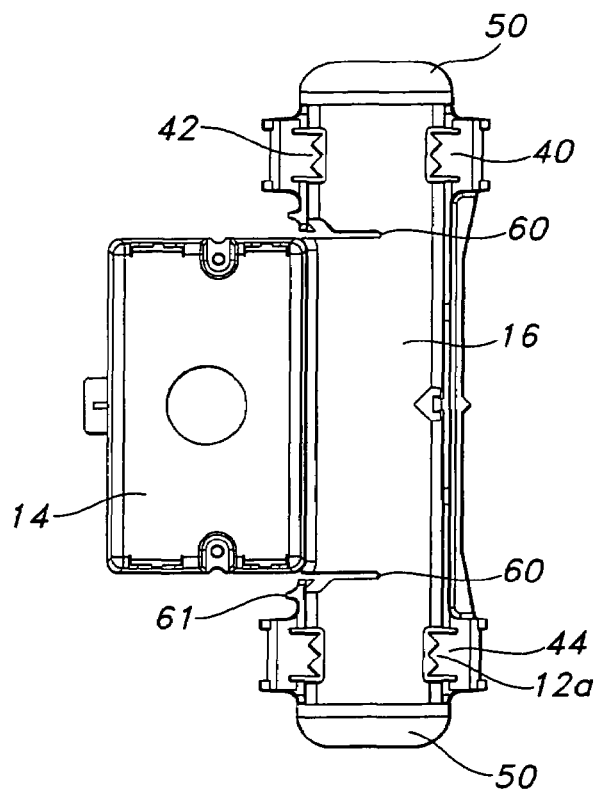
FIG. 5 is a rear plan view of the outlet box assembly of FIG. 1.

As more fully shown in FIGS. 3-5, the bracket 16 includes a stud attachment structure 40 which extends from each of the spaced apart arms 34 and 36 at opposite longitudinal ends thereof. Each stud attachment structure 40 includes an inwardly directed cantilevered gripping element 42 surrounded by a generally rectangular frame 44 to provide structural stability and prevent flexing of the arms thereat. The distal end of gripping element 42 may include wood piercing teeth 42a for engagement with the sides 12b and 12c of stud 12. The gripping elements 42 are positioned so that the bracket 16 may be attachable to the stud 12 and thereupon bite into the sides of the stud preventing removal therefrom.

Figure 6:
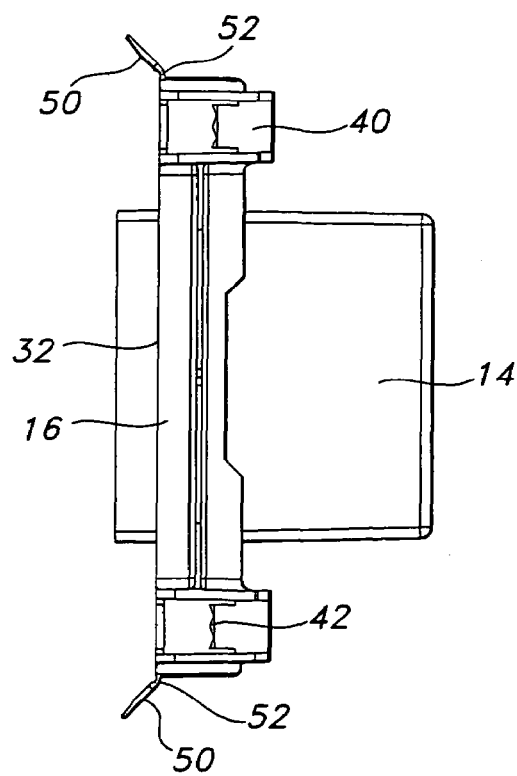
FIG. 6 is a side plan view of the outlet box assembly of FIG. 1.

Bracket 16 further includes a deflectable stiffening rib 50 at either distal end thereof. Stiffening rib 50 is attached to face 32 by a living hinge 52 (FIG. 6). This allows the stiffening rib to deflect outwardly from the plane of face 32 prior to the installation of a wall covering. As will be described in further detail herein below, stiffening ribs 50 help prevent the bracket from flexing upon application of a load to box 14. The face 32 of bracket 16 may also include an alignment aperture 55, which is used as a viewing opening to view a scribed mark placed on the face 12a of stud 12 by the installer for box alignment purposes.

The face 32 of bracket 16 also includes a pair of inwardly directed slots 60. Slots 60 extend from one arm 36 of assembly 10, which is common with lateral wall 24 of box 14. Slots 60 extend at a location adjacent the top and bottom walls 20 and 22, partially across face 32. As will be described in further detail herein below, the slots allow deflection of box 14 in a transverse direction indicated by arrow A in FIG. 2, without adversely affecting the grip of bracket 16 on stud 12. In addition, to also support the box on the stud during deflection, bracket 16 also includes inwardly directed fixed tooth 61 adjacent each slot 60.

Having described the structure of the electrical outlet box assembly in the present invention, use and operation may now be described.

Figure 2:
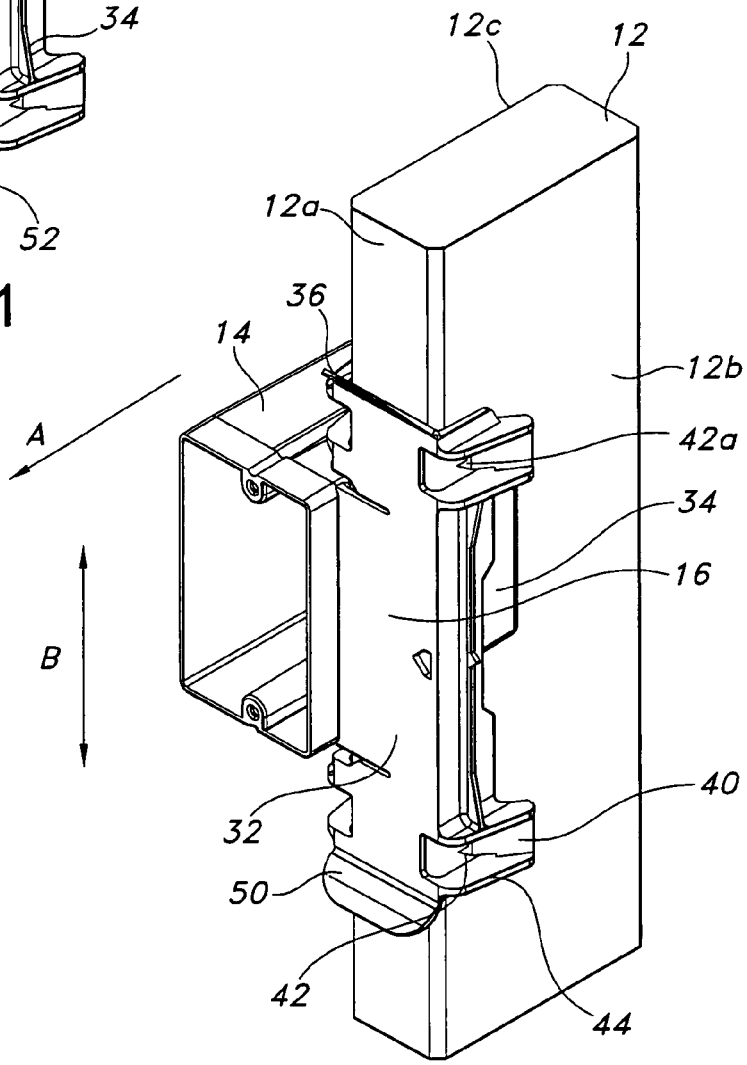
FIG. 2 shows the outlet box assembly of FIG. 1 attached to a wall stud.

Referring to FIGS. 2-4, the outlet box assembly 10 may be securely attached to a stud 12. An installer may optionally beforehand place a scribed mark on a stud indicating the desired vertical position of the box with respect to the stud. Thereafter, the installer snaps the assembly 10 onto the stud 12 by pushing the bracket 16 against the face of the stud and aligning the viewing aperture 55 with the scribed mark. The bracket 16 is pushed onto the stud until the face 32 of bracket 16 is supported flush against the face 12a of stud 12. The gripping elements 42 of stud attachment structure 40 deflect allowing insertable attachment of the bracket 16 onto the stud. Thereafter, the teeth 42a dig into the wooden stud at the sides 12b and 12c preventing withdrawal of the bracket from the stud. Engagement of the gripping elements 42 with the wooden stud sides prevent both horizontal and vertical movement of the outlet box assembly 10, even upon application of a load, either vertical as depicted by arrow B in FIG. 2, or horizontal as depicted by arrow A.

In addition to fixedly positioning the outlet box assembly with respect to the stud, the present invention provides for the secure positioning of the outlet box with respect to the stud regardless of a load placed on the box prior to completion of the project (attachment of the wall board). This is especially the case with respect to horizontal loads which may be placed on the box in a direction of arrow A such as during wire pulling. A load placed on box 14 will not result in the bracket becoming detached from the stud 12.

This is accomplished in one part by a provision of the stiffening ribs 50. These stiffening ribs 50 extend outwardly from the plane of face 32 and provide transverse stiffness to the planar face. Thus, a load placed on box 14 will not have a tendency to flex or deflect the face 32 of bracket 16 adjacent attachment structure 40. In addition, and as importantly, the slots 60 provide a relief area upon which a force placed on the box in the direction of arrow A will have a tendency to permit the box to flex forwardly. Such flexure will be absorbed by face 32 of bracket 16 as the slots allow the box 14 itself be so flexed or deflected. Moreover, upon such flexure, adjacent fixed teeth 61 will dig into the stud further gripping the bracket 16 to the stud.

The need to prevent a load placed on the box from causing detachment of the bracket is necessary only during the installation process. Once the wall board is attached to the stud, the ribs 50 are deflected back against the face 12a of stud 12. Obviously, once the wall board is applied, the wall board itself will restrict any excessive deflection of box 14.

The electrical outlet box shown in FIGS. 1-4 is a single gang electrical outlet box. It is contemplated that the bracket of the present invention may be used not only with a single gang electrical outlet box, but also with multiple gang boxes or a communications fixture frame and combinations thereof.

Figure 7:
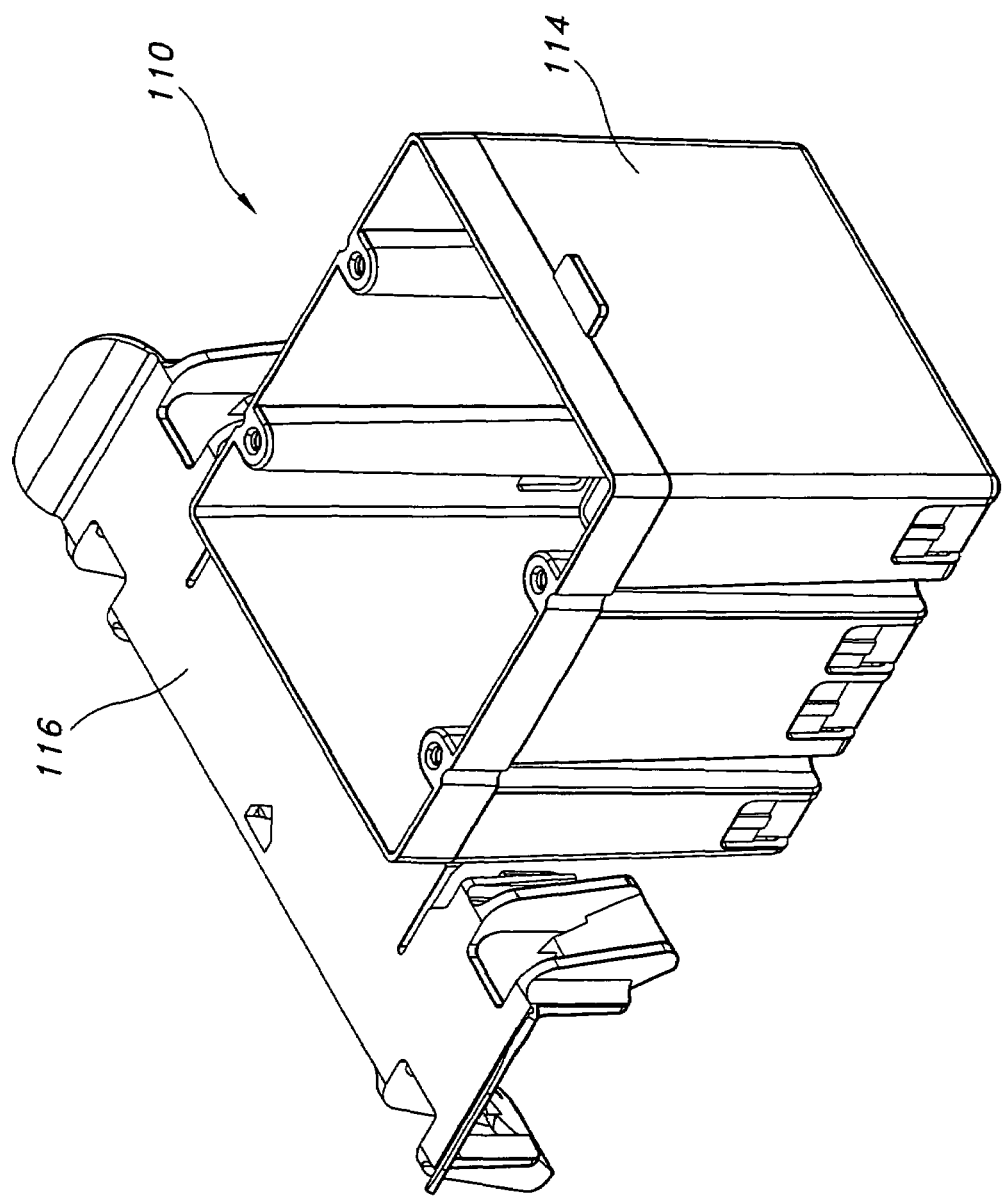
FIG. 7 shows a further embodiment of the present invention including a multiple gang outlet box.

Referring to FIG. 7, a further embodiment of the present invention is shown. Outlet box assembly 110 is substantially similar to outlet box assembly 10 shown above with respect to FIGS. 1-6. In the present illustrative embodiment, oulet box 114 is a double gang outlet box which accommodates two electrical fixtures such as switches and receptacles. While a double gang box is shown, it is further contemplated that other multiples such as a three gang box may also be employed. In all other respects, outlet box assembly 110 operates in a manner similar to outlet box assembly 10 of the present invention. The bracket 116 of assembly 110 is identical to bracket 16 described above.

Figure 8:
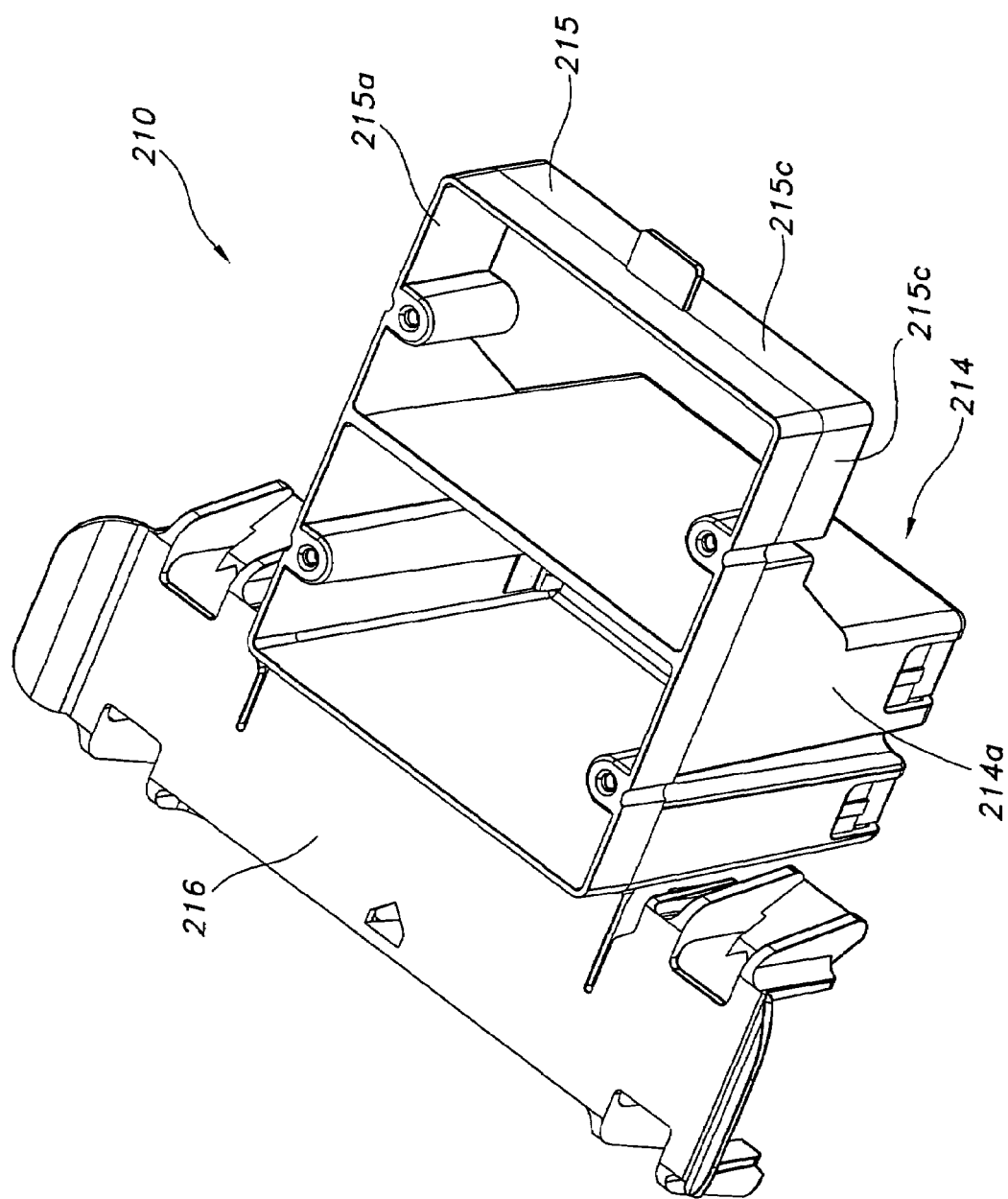
FIG. 8 shows a still further embodiment of the present invention including a single gang outlet box and a communication fixture frame.

Turning now to FIG. 8, a further embodiment of the present invention is shown. Outlet box assembly 210 again is substantially similar to outlet box assembly 10 described above. In the present illustrative embodiment, box 214 includes a single gang box 214a and a communications frame 215 extending therefrom. Communications frame 215 has upper and lower arms 215a and 215b, respectively, and a connecting side wall 215c. Thus, the frame forms a rectangular structure with the side wall of box 214a. As is well known in the art, frame 215 is designed to accommodate a communications fixture which under applicable codes need not be enclosed by a box. The embodiment shown in FIG. 8 incldes a single gang outlet box in combination with a communications frame. However, it is contemplated that a multiple gang box as well as a multiple gang frame may also be employed in combination. Bracket 216 which is supported on box 214a is identical in structure to bracket 16 described above.

Figure 9:
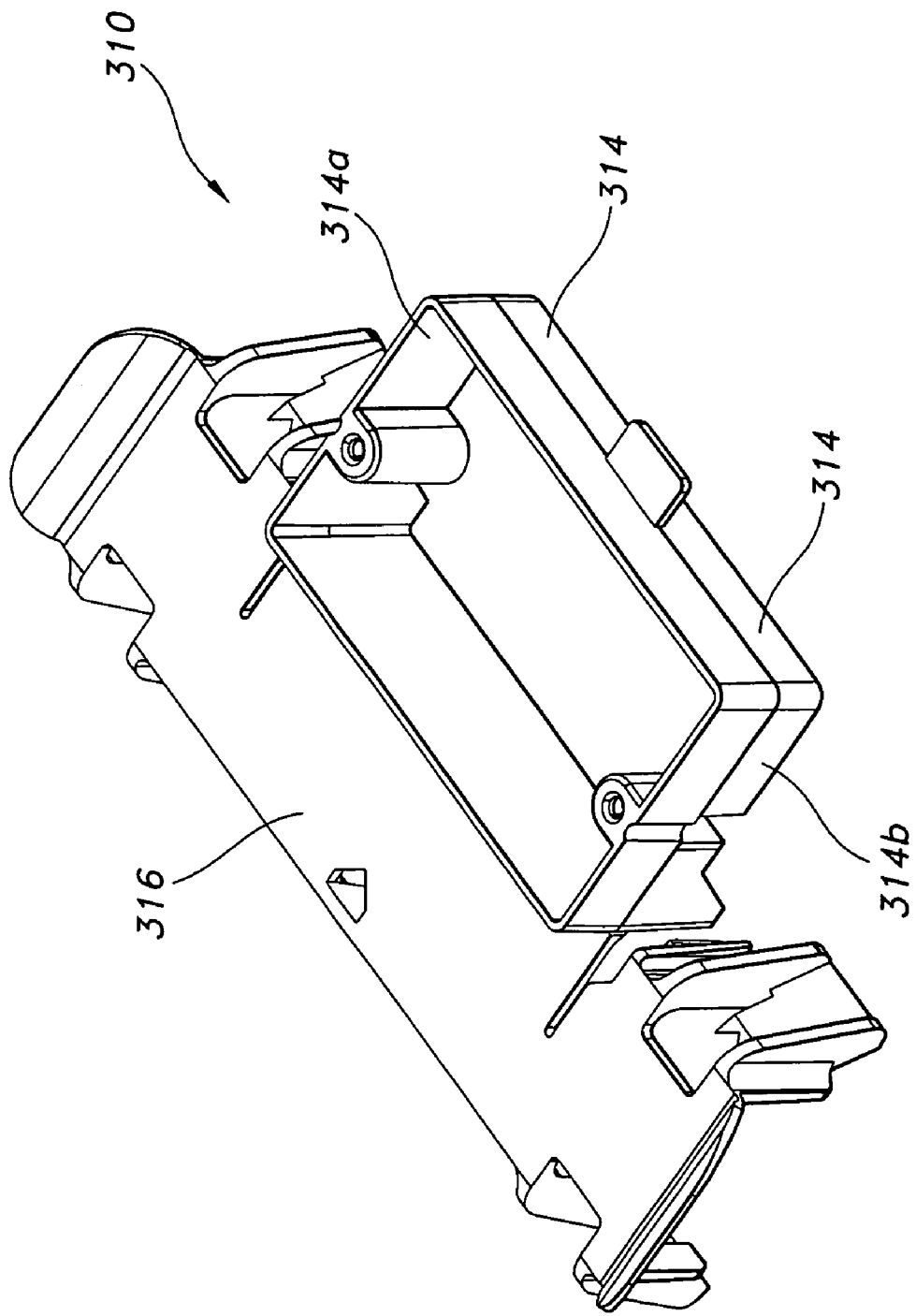
FIG. 9 is a yet further embodiment of the present invention showing a communication fixture frame.

Referring now to FIG. 9, a further embodiment of the present invention is shown. Outlet box assembly 310 includes a frame 314 attached directly to bracket 316. The frame is a communications frame used to support a communications fixture including upper and lower arms 314a and 314b, respectively, and adjoining side wall 314. Again, the frame 314 is shown for accommodation of a single communications fixture. However, a frame supporting multiple communications fixtures may also be employed. As with the embodiments, bracket 316 is identical to bracket 16 described above and operates in identical fashion.

Figure 10:
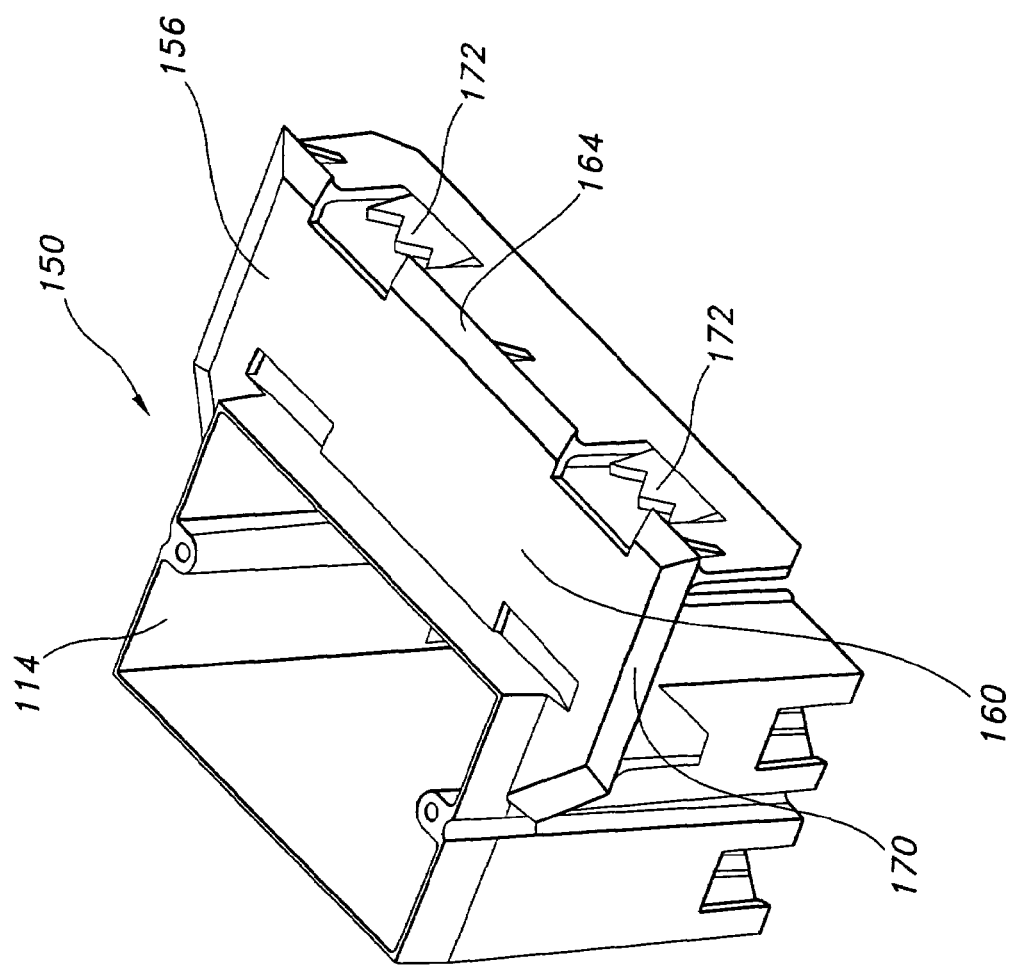
FIGS. 10 and 11 show in front and back perspective views, respectively, a further embodiment of the outlet box assembly of the present invention.
Figure 11:
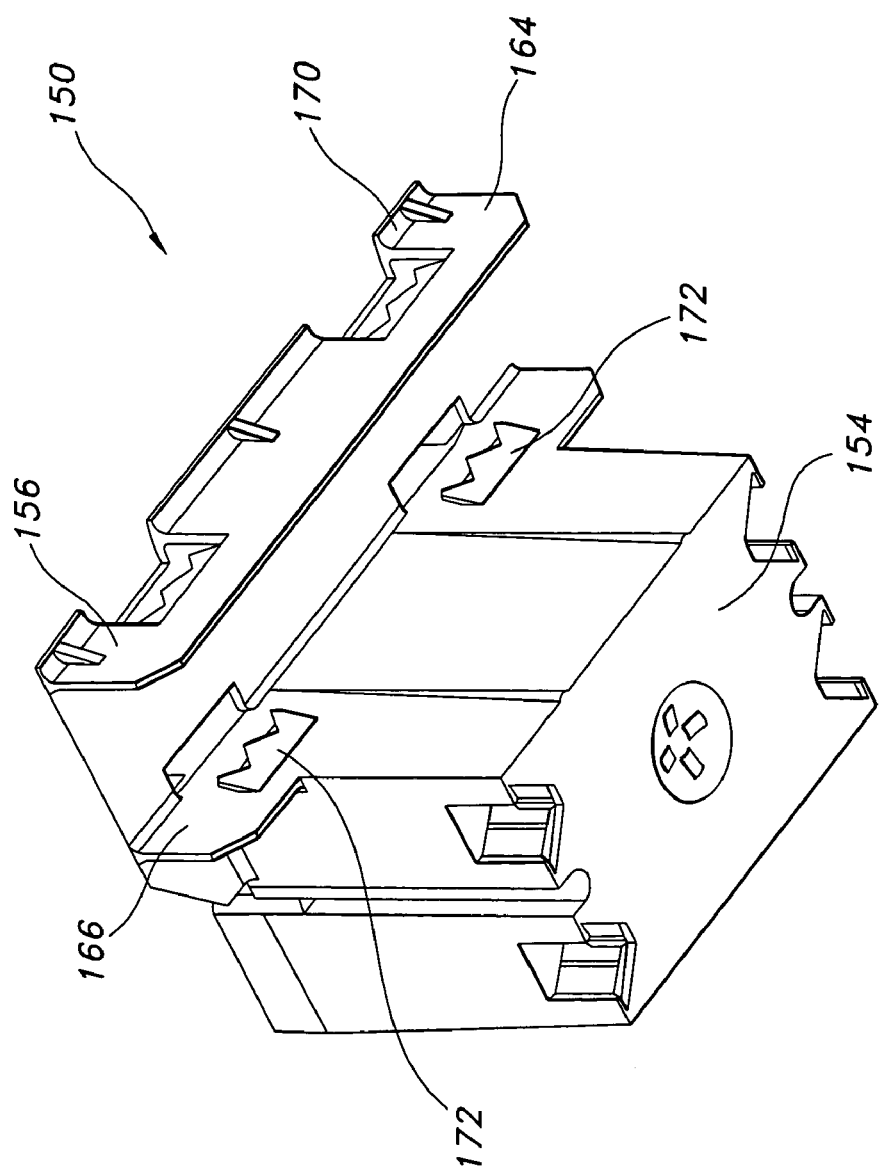

A further embodiment of the present invention is shown in FIGS. 10 and 11. In this embodiment the outlet box assembly 150 includes an electrical outlet box 154 and a securement bracket 156. The outlet box 154 is substantially similar to outlet box 14 described above. Furthermore, securement bracket 156 is generally of a U-shaped member having a planar face 160 and a pair of spaced apart arms 164 and 166 extending perpendicularly therefrom. Each of the arms includes inwardly directed cantilevered gripping element 172 which may be substantially as described above with respect to gripping element 42 of FIGS. 1-9. The planar face 160 of bracket 156 includes a beveled peripheral edge 170. Extending therearound, the beveled edge allows for a smooth transition with respect to a wall board that is later positioned over the box assembly.

Figure 12:
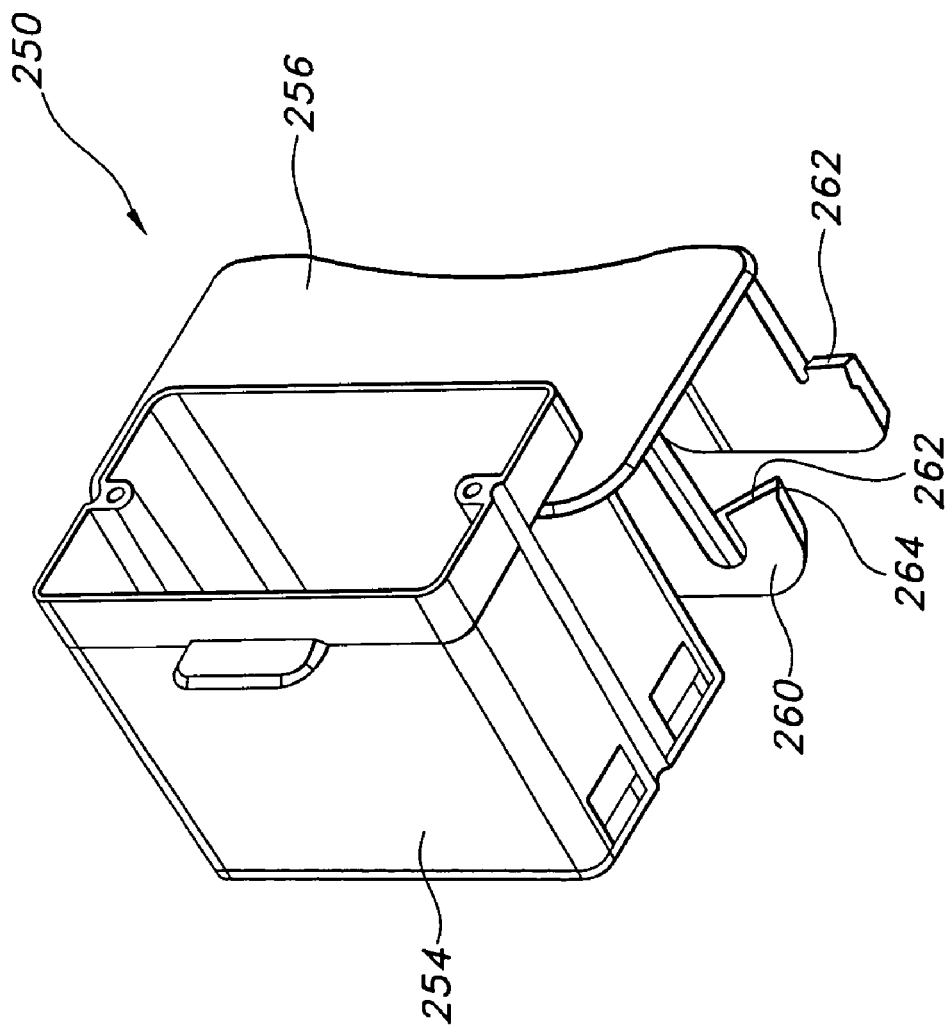
FIGS. 12 and 13 show in front and back perspective views, respectively, a still further embodiment of the outlet box assembly of the present invention.
Figure 13:
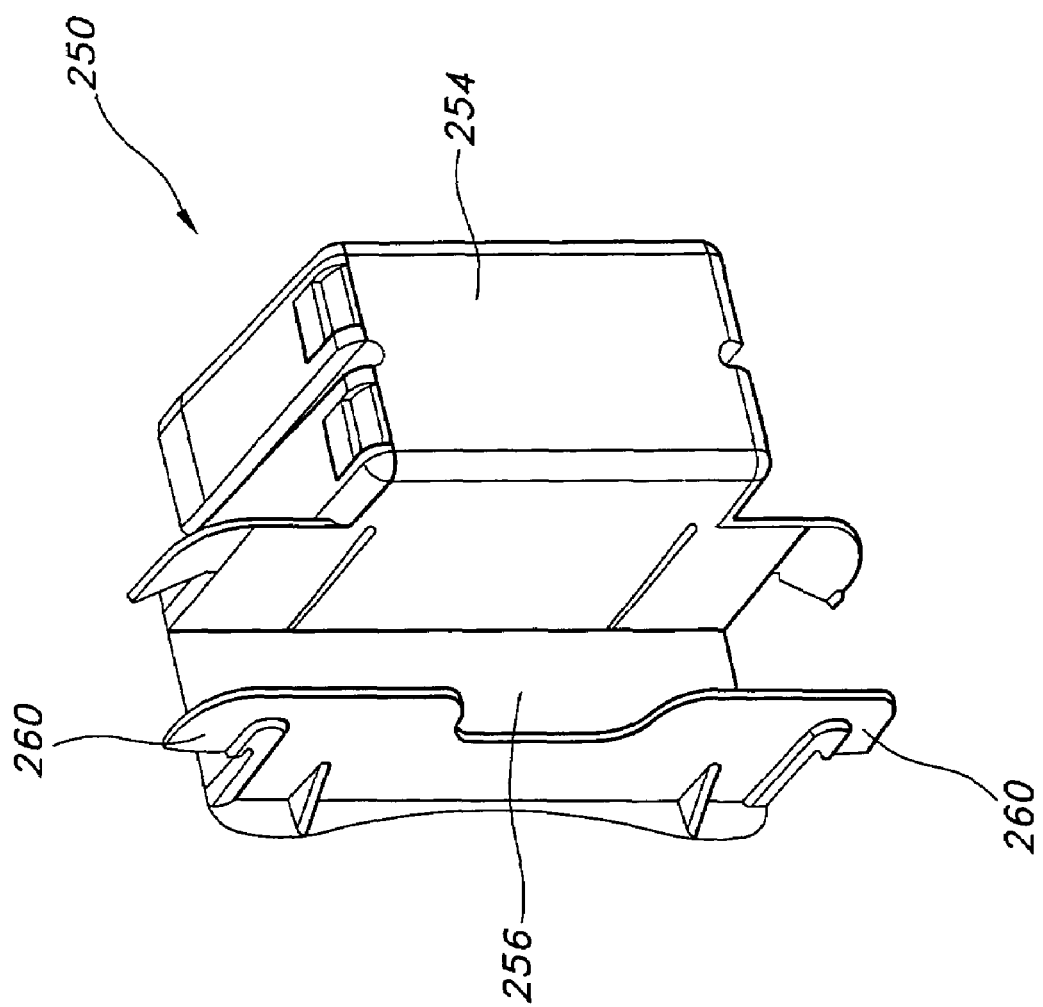

A still further embodiment of the present invention is shown in FIGS. 12 and 13 where an outlet box assembly 250 is shown. Outlet box assembly 250 includes an outlet box 254 and a securement bracket 256. In this embodiment, the opposite longitudinal ends of the bracket 256 include gripping elements 260. The gripping elements 260 include an angled portion 262 terminating at a point 264. The angled portion 258 angles the gripping elements inwardly. The gripping elements 260 allow the user to place the outlet box assembly over the structural support and hold the assembly securely in place. Since the gripping elements 260 bias inwards toward the stud, removal of the outlet box is prevented when the points 264 pierce the outer surface of the stud.

While the above-referenced embodiments are all specifically directed to mounting an electrical outlet box to a wall stud, the present invention further contemplates mounting an electrical outlet box to a ceiling stud.

Figure 14:
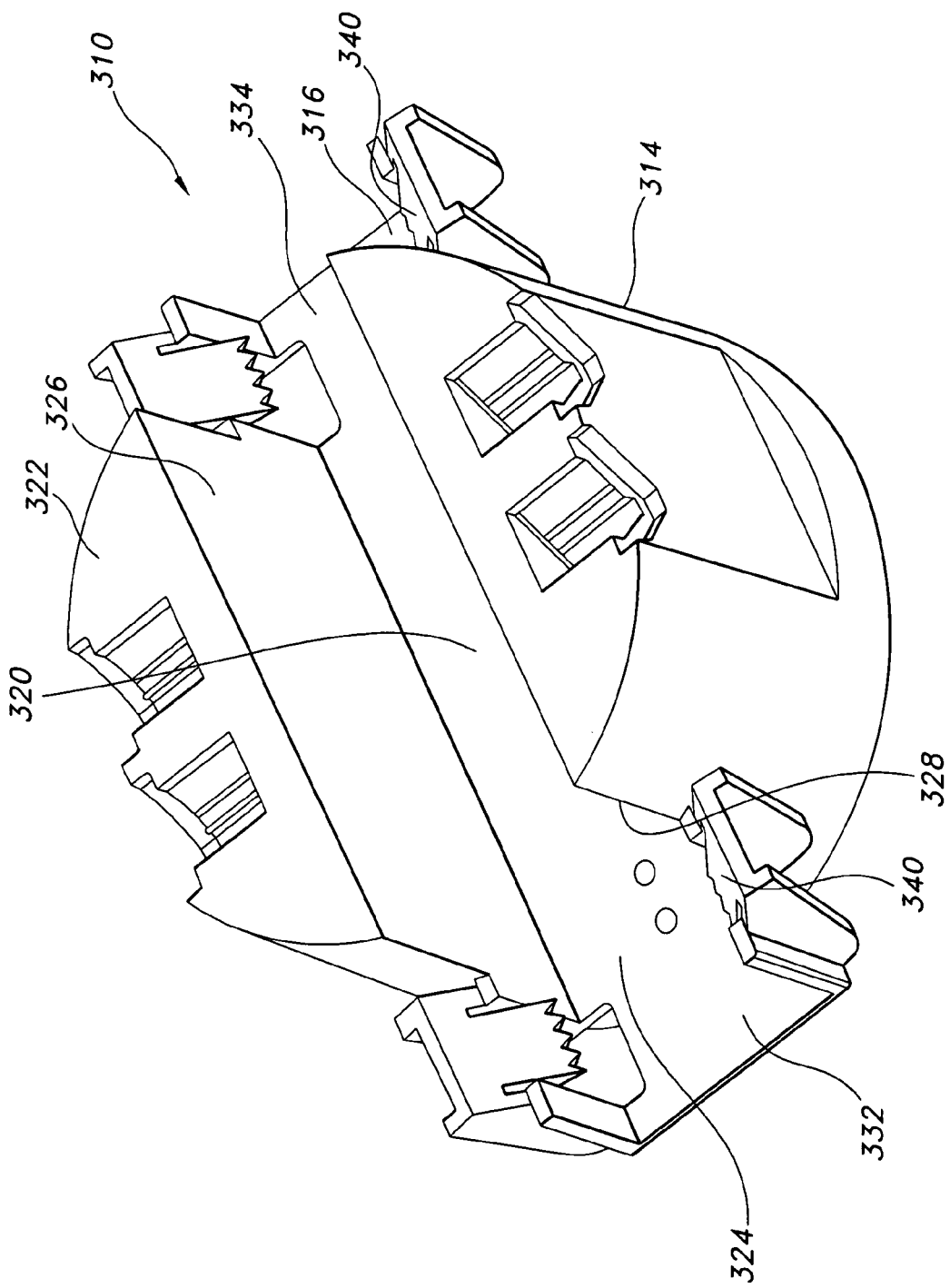
FIGS. 14 and 15 show in top and bottom perspective views, respectively, an electrical outlet box assembly of the present invention used to support fixtures to a ceiling stud.
Figure 15:
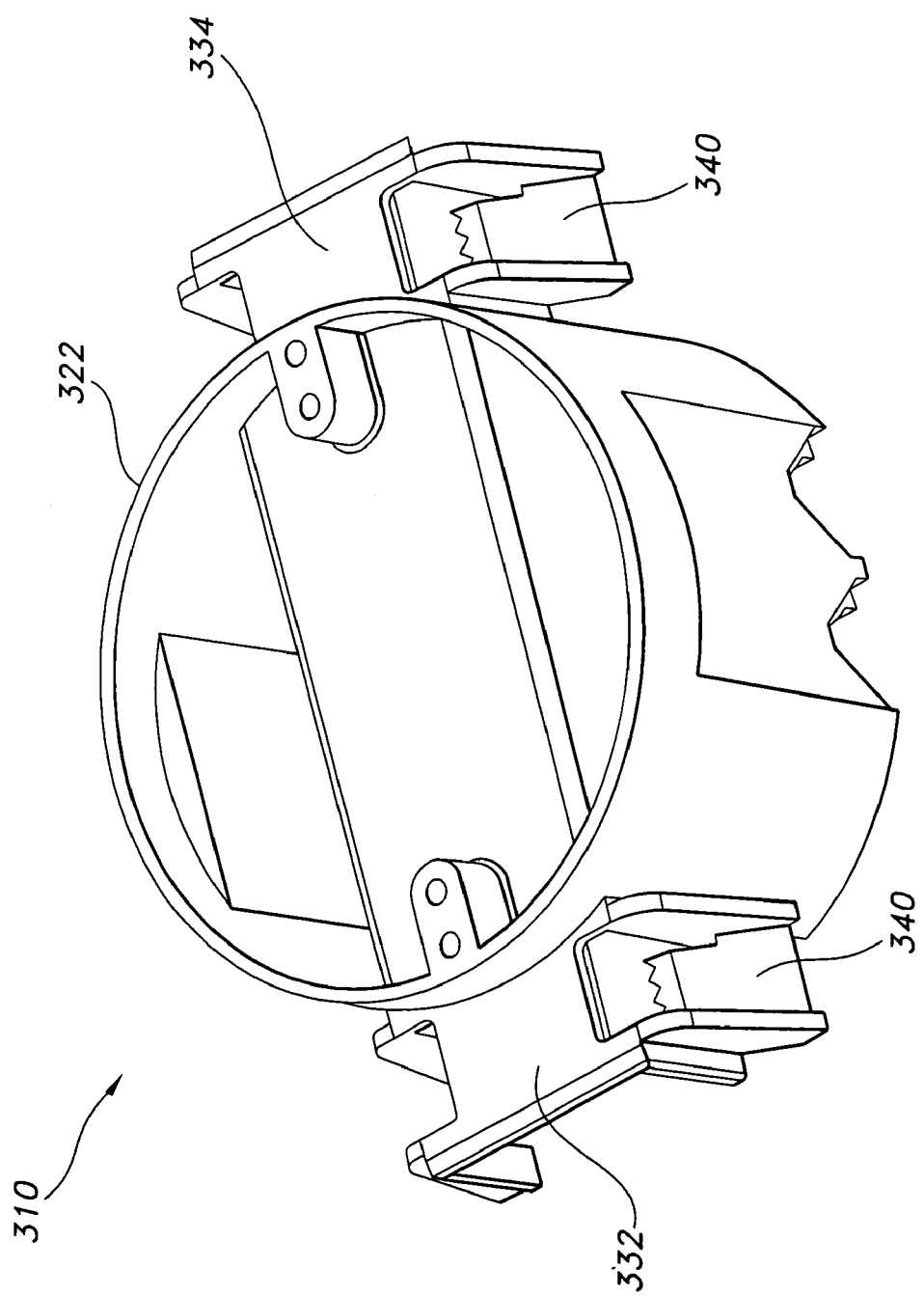

Referring now to FIGS. 14 and 15, an electrical outlet box assembly 310 is shown. Outlet box assembly 310 is preferably a non-metallic integral member formed of suitable molded plastic. The outlet box assembly 310 is designed to be self-secured or snapped onto a wood ceiling stud (not shown). Outlet box assembly 310 includes an electrical outlet box 314 and a securement bracket 316. The electrical outlet box 314 is somewhat of the type more fully shown and described in commonly assigned U.S. Pat. No. 6,827,229, issued Dec. 7, 2004, which is incorporated by reference herein for all purposes.

The outlet box assembly of the present embodiment may be used to secure such devices as lighting fixtures to a ceiling stud as is known in the art. The box 314 is generally cylindrical in shape including a body 322 having a planar lower surface 324. A pair of side members 326 and 328 extend upwardly from either side of lower surface 324. The side members 326 and 328 and the lower surface 324 define a generally U-shaped recess 320 for accommodating the ceiling stud therein.

Bracket 316 is coextensive with U-shaped recess 320 of box 314. The bracket 316 includes longitudinally spaced ends 332 and 334 extending beyond the box 314. Bracket 316 includes stud attachment structure 340 at each of the spaced apart ends 332 and 334. Stud attachment structure 340 is similar to that described with respect to the embodiments shown in FIGS. 1-9. In the present embodiment, the outlet box assembly 310 may be secured to a ceiling stud and may be used to secure electrical fixtures therein without need for using additional securement hardware to secure the box assembly 310 to the ceiling stud.

The present invention provides various combinations of boxes and frames which may be integrally supported by a bracket which allows attachment of a box to a stud and which prevents a load placed on the box or frame for causing detachment of the bracket from the stud. Moreover, such attachment is achieved without need for additional securement hardware.

A still further embodiment of the present invention is shown with respect to FIGS. 16 an 17. In this embodiment, an electrical outlet box assembly 410 is used to support electrical fixtures on both sides of a stud, such as a wall stud or a ceiling stud. Outlet box assembly 410 is preferably a nonmetallic integral member formed of suitable molded plastic. Outlet box 410 is designed to be self-secured or snapped onto a wood stud such as a ceiling stud or a wall stud and which provides support for fixtures on both sides of the stud.

Outlet box assembly 410 includes a generally conventional outlet box 414, a securement bracket 416 and a communications frame 418. The outlet box 414 and the communications frame 418 are mounted on either side of the securement bracket 416.

The bracket 416 is substantially similar to the brackets described above including a generally U-shaped configuration having a planar face 432 and a pair of spaced arms 434 and 436 extending perpendicularly therefrom. The planar face 432 is designed for flush support against the face of a stud. The arms 434 and 436 are designed to extend along the sides of the stud for engagement therewith.

Bracket 416 includes a stud attachment structure 440 which extends from each of the spaced apart arms 434 and 436 at opposite longitudinal ends thereof. The stud attachment structure 440 is similar to that described above. In all other respects, the bracket 416 includes a similar structure and operates in a similar manner to that of bracket 16 described above.

In the present illustrative embodiment, electrical outlet box 414 extends from spaced apart arm 434 while communications frame 418 extends from arm 436. Outlet box 414 and communications frame 418 are similar to that described above with respect to previous embodiments.

The present invention, therefore, allows mounting of an electrical power fixture in outlet box 414 and a communications fixture in communications frame 418 on opposite sides of a structural stud inasmuch as bracket 416 is mounted over the stud.

While the present illustrative embodiment shows an electrical box 414 mounted on one side of bracket 416 and a communications fixture 418 mounted on the other side thereof, it may be appreciated that any combination of electrical outlet boxes and communication frames may be used in accordance with the embodiment of FIGS. 16 and 17.

Various changes to the foregoing described and shown structures would now be evident to those skilled in the art. Accordingly, the particularly disclosed scope of the invention is set forth in the following claims.

What is claimed is:

1. An outlet box and communication frame assembly for mounting electrical fixtures to a structural stud comprising:
   a communication frame for supporting a communication fixture;
   an electrical outlet box for supporting an electrical power fixture; and
   a mounting bracket integrally formed with and extending between both said communication frame and said outlet box; said mounting bracket including a pair of spaced apart arms for engagement with opposite sides of said stud and wherein said communication frame is integrally formed with one of said arms and said outlet box is integrally formed with the other said arm such that said communication frame and said outlet box extend on said opposite sides of said bracket: said mounting bracket having integrally formed thereon an attachment structure for directly securing and positionally fixing said bracket to said structural stud without use of additional securement hardware.

2. An assembly of claim 1 wherein said bracket and said supports are integrally molded.

3. An assembly of claim 1 wherein said bracket is generally a U-shaped member having a planar face for positioning against the face of a stud [and a pair of space apart arms extending therefrom for engagement with opposite sides of said stud, each of said arms including said attachment structure].

4. An assembly of claim 1 wherein said outlet box includes a back wall and an open front face defining a box interior for supporting said power fixture.

5. An assembly of claim 1 wherein said communication frame includes upper and lower frame arms extending from one of said arms of said bracket.

6. An assembly of claim 5 wherein said connection frame includes a side wall connecting said upper and lower frame arms.

7. An assembly of claim 1 wherein said attachment structure includes a frame surrounding a resilient gripping element extending in cantilevered fashion from the frame, said gripping element being deflectable to allow attachment of said bracket to said stud and resiliently positionable in biting engagement with said stud to secure said bracket thereon.

\* \* \* \* \*

UNITED STATES PATENT AND TRADEMARK OFFICE
CERTIFICATE OF CORRECTION

PATENT NO. : 7,388,150 B2
APPLICATION NO. : 11/607222
DATED : June 17, 2008
INVENTOR(S) : Dinh et al.

It is certified that error appears in the above-identified patent and that said Letters Patent is hereby corrected as shown below:

On the Title Page, the printed patent incorrectly reads, Item "(74) Attorney, Agent, or Firm - Hoffman & Baron, LLP"; the patent should read Item --(74) Attorney, Agent, or Firm - Hoffmann & Baron, LLP--.

At column 8, claim 3, lines 17-22, reads "An assembly of claim 1 wherein said bracket is generally a U-shaped member having a planar face for positioning against the face of a stud [and a pair of space apart arms extending therefrom for engagement with opposite sides of said stud, each of said arms including said attachment structure.]"; the patent should read --An assembly of claim 1 wherein said bracket is generally a U-shaped member having a planar face for positioning against the face of a stud.--.

Signed and Sealed this

Nineteenth Day of August, 2008

JON W. DUDAS
*Director of the United States Patent and Trademark Office*